(12) United States Patent
Masuda et al.

(10) Patent No.: US 8,807,545 B2
(45) Date of Patent: *Aug. 19, 2014

(54) LIQUID-SEALED ANTIVIBRATION DEVICE

(75) Inventors: Tatsunori Masuda, Osaka (JP);
Kentaro Yamamoto, Osaka (JP); Gen Isawa, Osaka (JP); Katsuhiro Sakurai, Aichi (JP)

(73) Assignees: Toyo Tire & Rubber Co., Ltd., Osaka-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,946

(22) Filed: Mar. 16, 2012

(65) Prior Publication Data

US 2012/0248669 A1 Oct. 4, 2012

(30) Foreign Application Priority Data

Mar. 31, 2011 (JP) ................................. 2011-080002

(51) Int. Cl.
*F16F 13/00* (2006.01)
(52) U.S. Cl.
USPC .................................................... 267/140.13
(58) Field of Classification Search
CPC ......... F16F 13/10; F16F 13/22; F16F 13/101; F16F 13/105; F16F 13/106; F16F 13/108
USPC ................... 267/140.11, 140.13, 140.14, 219
See application file for complete search history.

(56) References Cited

U.S. PATENT DOCUMENTS

| 4,787,611 | A | * | 11/1988 | Sciortino | 267/140.13 |
| 5,104,100 | A | * | 4/1992 | Simuttis | 267/140.13 |
| 5,769,402 | A | * | 6/1998 | Ide et al. | 267/140.14 |
| 6,311,963 | B1 | * | 11/2001 | Suzuki et al. | 267/140.13 |

(Continued)

FOREIGN PATENT DOCUMENTS

| JP | 64-049731 | A | * | 2/1989 | F16F 13/00 |
| JP | 01098722 | A | * | 4/1989 | F16F 13/00 |

(Continued)

OTHER PUBLICATIONS

Office Action dated Oct. 3, 2013, issued in related U.S. Appl. No. 13/409,648 (24 pages).

(Continued)

*Primary Examiner* — Bradley King
*Assistant Examiner* — Stephen Bowes
(74) *Attorney, Agent, or Firm* — Westerman, Hattori, Daniels & Adrian, LLP

(57) ABSTRACT

A partition element partitions a liquid-sealed chamber into a main liquid chamber and a first sub liquid chamber. A first orifice flow passage for connecting both liquid chambers is provided. A second diaphragm is formed in the partition element. The partition element includes a second sub liquid chamber partitioned from the main liquid chamber by the second diaphragm and a second orifice flow passage for connecting the first and second sub liquid chambers to each other. A valve portion brought into contact with a periphery around an opening of the second orifice flow passage is formed on a flexible membrane portion of the second diaphragm into a surrounding wall shape. A through hole is formed outside the valve portion, and a projection compressed by a counter wall is formed on a membrane surface of the flexible membrane portion on a main liquid chamber side.

12 Claims, 5 Drawing Sheets

(56) References Cited

U.S. PATENT DOCUMENTS

| | | |
|---|---|---|
| 6,491,290 B2 | 12/2002 | Muramatsu et al. |
| 6,523,816 B1 | 2/2003 | Gastineau et al. |
| 7,328,888 B2 | 2/2008 | Sakata |
| 7,464,918 B2 * | 12/2008 | Hatakeyama et al. ... 267/140.13 |
| 2002/0043748 A1 * | 4/2002 | Meyer ............... 267/140.11 |
| 2002/0109280 A1 * | 8/2002 | Baudendistel et al. .. 267/140.15 |
| 2006/0071381 A1 * | 4/2006 | Hatakeyama et al. ... 267/140.13 |
| 2007/0085249 A1 | 4/2007 | Happou et al. |
| 2008/0290573 A1 | 11/2008 | Katayama et al. |
| 2009/0140477 A1 | 6/2009 | Michiyama |
| 2011/0210488 A1 | 9/2011 | Yamamoto et al. |

FOREIGN PATENT DOCUMENTS

| | | | | |
|---|---|---|---|---|
| JP | 03121958 A | | 5/1991 | |
| JP | 2006118547 A | | 5/2006 | |
| JP | 2007051713 A | * | 3/2007 | ............ F16F 13/18 |
| JP | 2007-107712 A | | 4/2007 | |
| JP | 2007-270866 A | | 10/2007 | |
| JP | 2008-175321 A | | 7/2008 | |
| JP | 2009-133453 A | | 6/2009 | |
| JP | 2010071452 A | * | 4/2010 | ............ F16F 13/18 |
| JP | 2010101466 A | * | 5/2010 | ............ F16F 13/18 |
| JP | 2010139023 A | | 6/2010 | |
| WO | WO 2010032344 A1 | * | 3/2010 | ............ F16F 13/10 |
| WO | 2010119595 A1 | | 10/2010 | |

OTHER PUBLICATIONS

Chinese Office Action dated Dec. 4, 2013, issued in corresponding Chinese Patent Application No. 201210089181.0 with partial translation (13 pages).

Chinese Office Action dated Dec. 4, 2013, issued in corresponding Chinese Patent Application No. 201210061740.7 with partial translation (11 pages).

Office Action dated Oct. 3, 2013, issued in related U.S. Appl. No. 13/409,648 (23 pages).

U.S. Final Office Action dated Apr. 21, 2014, issued in related U.S. Appl. No. 13/409,648 (23 pages).

* cited by examiner

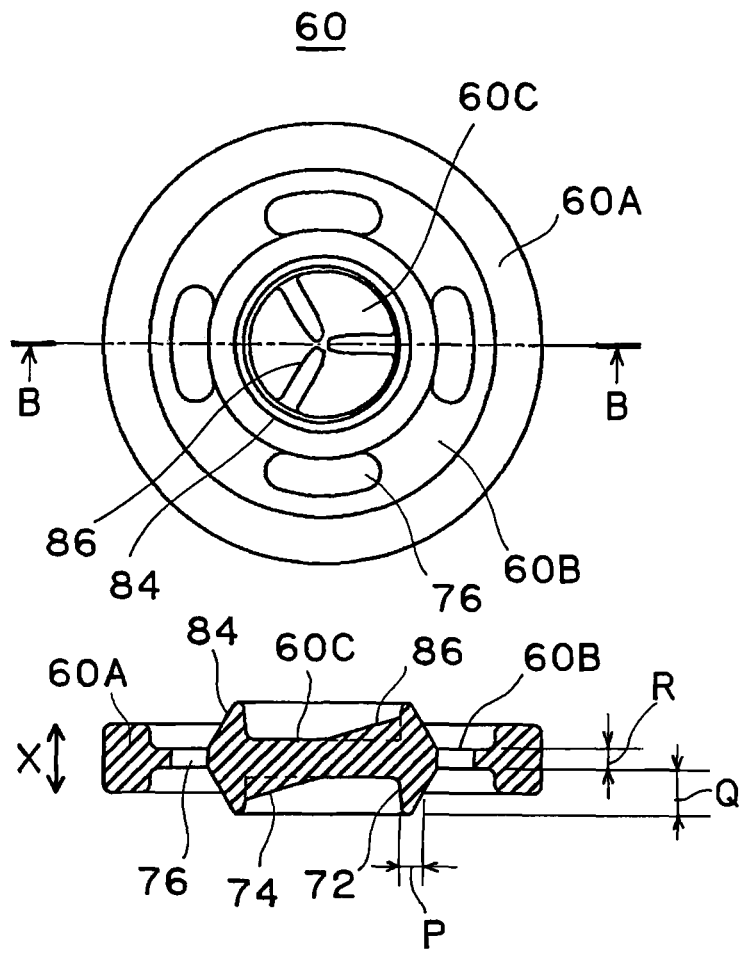
FIG. 7A
FIG. 7B
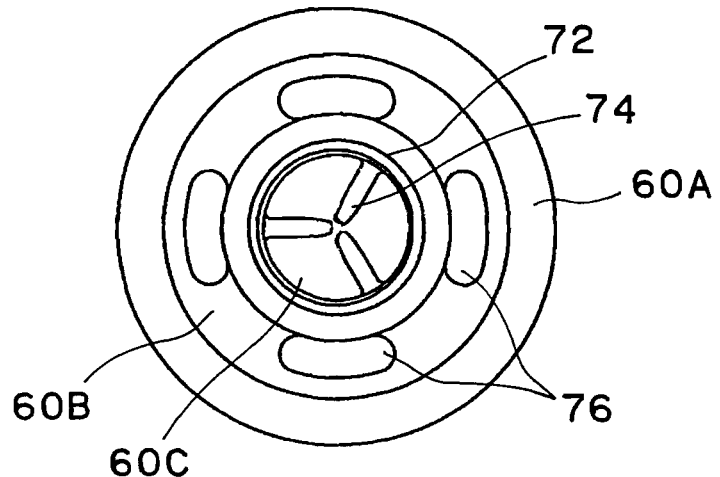
FIG. 7C

LIQUID-SEALED ANTIVIBRATION DEVICE

CROSS-REFERENCE TO RELATED APPLICATIONS

This application is based upon and claims the benefit of priority from the prior Japanese Patent Application No. 2011-80002, filed on Mar. 31, 2011; the entire contents of which are incorporated herein by reference.

BACKGROUND

1. Technical Field

The disclosure relates to a liquid-sealed antivibration device.

2. Related Art

As an antivibration device such as an engine mount which supports a vibration source such as an automobile engine or the like while preventing the transmission of vibrations of the vibration source to a vehicle body side, there has been known a liquid-sealed antivibration device. The liquid-sealed antivibration device includes: a first mounting part which is mounted on the vehicle body side; a second mounting part which is mounted on a vibration source side; an antivibration base body which is interposed between the first mounting part and the second mounting part and is made of an elastomer; a main liquid chamber whose chamber wall is partially formed of the antivibration base body; a sub liquid chamber whose chamber wall is partially formed of a diaphragm; and an orifice flow passage which allows the main liquid chamber and the sub liquid chamber to communicate with each other.

In such a liquid-sealed antivibration device, when normal vibrations are inputted, due to a liquid column resonance action brought about by the flow of a liquid in an orifice flow passage or a vibration control effect of the antivibration base body, the liquid-sealed antivibration device performs a vibration damping function and a vibration insulating function. However, when large vibrations are inputted, the antivibration device per se becomes an abnormal sound generation source and there may be a case where an abnormal sound is transmitted in a cabin.

This abnormal sound is generated by cavitation in the liquid chamber. Cavitation is a phenomenon where when large vibrations are inputted to an antivibration device, an orifice flow passage is clogged so that the inside of a main liquid chamber is brought into an excessive negative pressure state (that is, a state where a liquid pressure in the main liquid chamber is lower than a predetermined value) and the pressure in the main liquid chamber becomes lower than a saturated vapor pressure of a sealed liquid thus generating a large number of bubbles. An impact sound which is generated when bubbles generated in this manner extinguish becomes an abnormal sound and is transmitted to the outside.

To prevent the generation of the abnormal sound caused by cavitation, for example, JP-A-2007-107712 discloses the constitution where a short-circuiting passage which short-circuits a main liquid chamber and a sub liquid chamber is formed in a partition member which partitions the main liquid chamber and the sub liquid chamber, and a valve element which switches the short-circuiting passage between a communication state and an interruption state is formed of a metal spring such as a plate spring whereby when the main liquid chamber is brought into an excessively negative pressure state, the short-circuiting passage is opened so that a liquid is supplied to the main liquid chamber from the sub liquid chamber. JP-A-2007-270866 also discloses the constitution where a valve element similar to the above-mentioned valve element is held by a spring.

JP-A-2008-175321 discloses the structure where a movable membrane is mounted on a partition element which partitions a main liquid chamber and a sub liquid chamber, a slit-like opening portion which functions as a valve element is formed in a portion of the movable membrane, and the valve element is arranged offset toward a sub liquid chamber side with respect to a valve element displacement restricting member thus imparting a function of a check valve.

The constitution disclosed in JP-A-2007-107712 adopts the structure where the metal spring and the partition member are brought into contact with each other by way of the valve element and hence, in returning the valve element to an original position after opening the valve, rigid bodies collide each other so that there exists a possibility that an abnormal sound is generated due to a large impact. Further, the metal spring is in an antifreeze liquid and hence, rust prevention treatment becomes necessary thus pushing up a cost. The constitution disclosed in JP-A-2007-270866 also adopts the structure where a valve element mainly made of metal which is directly connected with a spring is brought into contact with a partition member and hence, the constitution has a similar drawback.

On the other hand, in JP-A-2008-175321, there exists a possibility that a liquid always leaks from the slit formed in the valve element portion of the movable membrane and hence, the constitution has a drawback that a dumping performance by an orifice flow passage on the outer periphery which is to be originally exerted in a normal use region is lowered.

SUMMARY

A liquid-sealed antivibration device according to an embodiment includes: a first mounting part to be mounted on one of a vibration source side and a support side; a second mounting part to be mounted on the other of the vibration source side and the support side; an antivibration base body formed of an elastomer which is interposed between the first mounting part and the second mounting part; a main liquid chamber whose chamber wall is partially formed of the antivibration base body and in which a liquid is sealed; a first sub liquid chamber whose chamber wall is partially formed of a first diaphragm formed of an elastomer and in which a liquid is sealed; a partition element which partitions the main liquid chamber and the first sub liquid chamber; and a first orifice flow passage which connects the main liquid chamber with the first sub liquid chamber. The partition element includes: a second diaphragm which is formed of an elastomer and includes an outer peripheral portion which is liquid-tightly held by the partition element and a flexible membrane portion which is arranged inside the outer peripheral portion; a second sub liquid chamber which is divided from the main liquid chamber by way of the second diaphragm; a second orifice flow passage which connects the first sub liquid chamber and the second sub liquid chamber to each other while being tuned to a frequency range higher than a frequency range to which the first orifice flow passage is tuned; and a counter wall which faces a membrane surface of the flexible membrane portion on a main liquid chamber side in an opposed manner with a space defined therebetween on a main liquid chamber side of the second diaphragm. In the flexible membrane portion, a valve portion which is brought into contact with a partition element wall surface around an opening of the second orifice flow passage and closes the opening while surrounding the opening is formed into a surrounding wall shape such that the valve portion is raised from the membrane surface of the flexible membrane portion. A space surrounded by the valve portion inside the valve portion having the surrounding wall shape forms the second sub liquid chamber. A through hole is formed in the flexible membrane portion outside the valve portion, and a projection which is brought into pressure contact with the counter wall is formed on the membrane surface of the flexible membrane portion on a main liquid chamber side.

According to one embodiment, the projection may be formed at a position where the projection overlaps the valve portion with the flexible membrane portion sandwiched therebetween, and the valve portion and the projection may be held in a compressed state between the partition element wall surface around the opening and the counter wall. In this case, the projection may be formed into a surrounding wall shape at a position where the projection overlaps the valve portion with the flexible membrane portion sandwiched therebetween. Further, the valve portion and the projection may be formed in a symmetrical shape with respect to a center surface of the flexible membrane portion in the thickness direction.

According to one embodiment, a rib may be formed on a membrane portion inside the valve portion. According to one embodiment, a center through hole may be formed in the counter wall at a position where the center through hole faces the membrane portion inside the valve portion in an opposed manner, plural outer peripheral through holes may be formed around the center through hole, and the projection may have a surrounding wall shape surrounding the center through hole. These respective embodiments may be combined suitably.

BRIEF DESCRIPTION OF THE DRAWINGS

FIG. 7A to FIG. 7C are views showing the second diaphragm of the embodiment, wherein FIG. 7A is a plan view, FIG. 7B is a cross-sectional view taken along a line B-B in FIG. 7A, and FIG. 7C is a bottom plan view.

DETAILED DESCRIPTION

Figure 1:
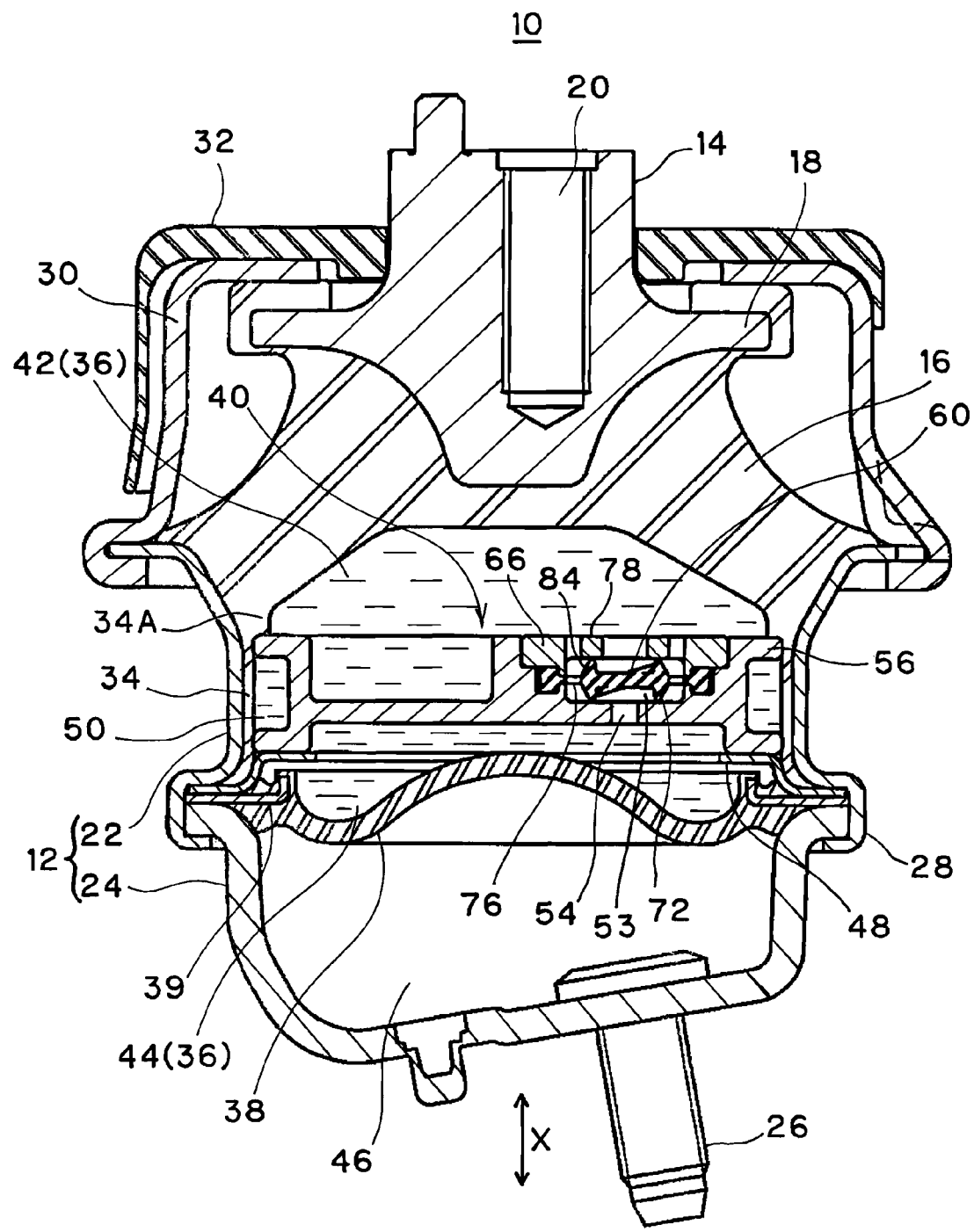
FIG. 1 is a longitudinal cross-sectional view of a liquid-sealed antivibration device according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of an embodiment is to provide a liquid-sealed antivibration device which can ensure the damping performance in a normal-use region and can attenuate the cavitation caused by a sudden change in pressure which occurs when vibrations of large amplitude are inputted.

FIG. 1 is a longitudinal cross-sectional view of a liquid-sealed antivibration device 10 according to the embodiment. The liquid-sealed antivibration device 10 is an engine mount which supports an engine of an automobile, and includes a first mounting part 12 on a lower side having a cylindrical shape which is mounted on a vehicle body which constitutes a support side, a second mounting part 14 on an upper side which is mounted on an engine side which constitutes a vibration source, and an antivibration base body 16 formed of a rubber elastic body which is interposed between both mounting parts 12, 14 so as to connect both mounting parts 12, 14 to each other. Here, FIG. 1 shows the liquid-sealed antivibration device 10 in an unloaded state.

The second mounting part 14 is a boss fitting arranged above the first mounting part 12 along an axis of the first mounting part 12, and a stopper portion 18 which projects radially outwardly in a flange shape is formed on the second mounting part 14. A bolt hole 20 is formed in an upper end portion of the second mounting part 14, and the second mounting part 14 is configured to be mounted on the engine side by means of a bolt not shown in the drawing.

The first mounting part 12 is constituted of a circular cylindrical fitting 22 on which the antivibration base body 16 is formed by vulcanization and a cup-shaped bottom fitting 24. A mounting bolt 26 extending downwardly is mounted on the bottom fitting 24 in a projecting manner, and the first mounting part 12 is configured to be mounted on the vehicle body side by means of the bolt 26. A lower end portion of the cylindrical fitting 22 is caulked and fixed to an upper-end opening portion of the bottom fitting 24 by a caulking part 28. Symbol 30 indicates a stopper fitting which is caulked and fixed to an upper end portion of the cylindrical fitting 22, and the stopper fitting 30 exhibits a stopper action between the stopper part 18 of the second mounting part 14 and itself. Symbol 32 indicates a stopper rubber which covers an upper surface of the stopper fitting 30.

The antivibration base body 16 is formed into an umbrella shape, wherein an upper end portion of the antivibration base body 16 is adhered to the second mounting part 14 by vulcanization and a lower end portion of the antivibration base body 16 is adhered to an upper-end opening portion of the cylindrical fitting 22 by vulcanization respectively. A rubber-film-like seal wall portion 34 which covers an inner peripheral surface of the cylindrical fitting 22 is continuously formed with the lower end portion of the antivibration base body 16.

A first diaphragm 38 which is formed of a flexible rubber membrane is mounted on the first mounting part 12 such that the first diaphragm 38 is arranged so as to face a lower surface of the antivibration base body 16 in an opposed manner in the axial direction X and forms a liquid-sealed chamber 36 between the first diaphragm 38 and the lower surface of the antivibration base body 16, and a liquid such as water, ethylene glycol or silicone oil is sealed in the liquid-sealed chamber 36. The first diaphragm 38 includes an annular reinforcing fitting 39 on an outer peripheral portion thereof, and is fixed to the caulking portion 28 by means of the reinforcing fitting 39.

The above-mentioned liquid-sealed chamber 36 which is defined in the inside of the first mounting part 12 is partitioned into a main liquid chamber 42 on an antivibration base body 16 side (that is, an upper side) and a first sub liquid chamber 44 on a first diaphragm 38 side (that is, a lower side) by a partition element 40. The main liquid chamber 42 is a liquid chamber whose chamber wall is partially formed of the antivibration base body 16, and the first sub liquid chamber 44 is a liquid chamber whose chamber wall is partially formed of the first diaphragm 38. Below the first diaphragm 38, an air chamber 46 is defined in the inside of the bottom fitting 24. Accordingly, the first diaphragm 38 is a diaphragm which constitutes a partition wall between the first sub liquid chamber 44 and the air chamber 46.

The partition element 40 has a circular shape as viewed in a plan view, is fitted in the inside of the cylindrical fitting 22 by way of the seal wall portion 34, and is made of a rigid material such as a resin or metal. A ring-plate-shaped partition receiving plate 48 is arranged on a lower surface of the partition element 40 in a contact manner. By fixing the partition receiving plate 48 together with the reinforcing fitting 39 of the first diaphragm 38 by the caulking portion 28, the partition element 40 is held in a state where the partition element 40 is sandwiched between a stepped portion 34A formed on the seal wall portion 34 and the partition receiving plate 48 in the axial direction X.

The main liquid chamber 42 and the first sub liquid chamber 44 communicate with each other through a first orifice flow passage 50 which is a throttle flow passage. In this embodiment, the first orifice flow passage 50 is a low-frequency-side orifice which is tuned to a low frequency range (for example, approximately 5 to 15 Hz) corresponding to shaking vibrations so as to damp shaking vibrations at the time of traveling of a vehicle. That is, the tuning is performed by adjusting a cross-sectional area and a length of a flow passage such that a damping effect based on a resonance action of a liquid which flows through the first orifice flow passage 50 can be effectively acquired when shaking vibrations are inputted.

The first orifice flow passage 50 is formed on an outer peripheral side of the partition element 40. To be more specific, the first orifice flow passage 50 which extends in the circumferential direction C (see FIG. 3) is formed between a first orifice forming groove 52 (see FIG. 2) which is formed on the outer peripheral portion of the partition element 40 and is opened outwardly and the above-mentioned seal wall portion 34. As shown in FIG. 3, the first orifice flow passage 50 is an orifice flow passage which includes a main-liquid-chamber-side opening 50A which opens toward the main liquid chamber 42 at one end thereof in the circumferential direction C and a sub-liquid-chamber-side opening 50B which opens toward the first sub liquid chamber 44 at the other end thereof in the circumferential direction C, and is in a constant communicable state where the first orifice flow passage 50 is always communicated with both the main liquid chamber 42 and the first sub liquid chamber 44 without being closed.

Figure 5:
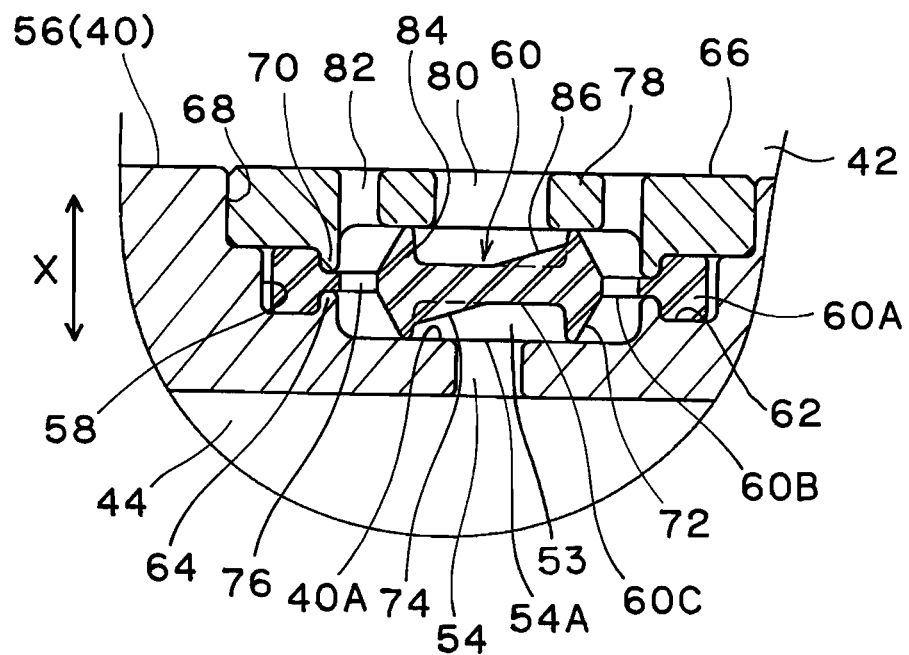
FIG. 5 is an enlarged cross-sectional view of a part of the partition element in a normal use region (normal use region)

A second diaphragm 60 which is formed of a rubber elastic body is mounted on the partition element 40. As shown in FIG. 5, the second diaphragm 60 has an outer peripheral portion 60A thereof liquid-tightly held by the partition element 40 (that is, for preventing leaking of a liquid) and has a flexible membrane portion 60B which is formed inside the outer peripheral portion 60A. Further, a second sub liquid chamber 53 which is partitioned from the main liquid chamber 42 by means of the second diaphragm 60 is formed in the partition element 40, and a second orifice flow passage 54 which constitutes a throttle flow passage connecting the first sub liquid chamber 44 and the second sub liquid chamber 53 to each other is also formed in the partition element 40.

The second orifice flow passage 54 is a high-frequency-side orifice which is tuned to a frequency range higher than a frequency range to which the first orifice flow passage 50 is tuned. In this embodiment, the second orifice flow passage 54 is tuned to a high frequency range (for example, approximately 15 to 50 Hz) corresponding to idling vibrations so as to reduce idling vibrations at the time of idling of a vehicle (vehicle stopped state). That is, the tuning is performed by adjusting a cross-sectional area and a length of a flow passage such that a low dynamic spring effect based on a resonance action of a liquid which flows through the second orifice flow passage 54 can be effectively acquired when idling vibrations are inputted.

Figure 2:
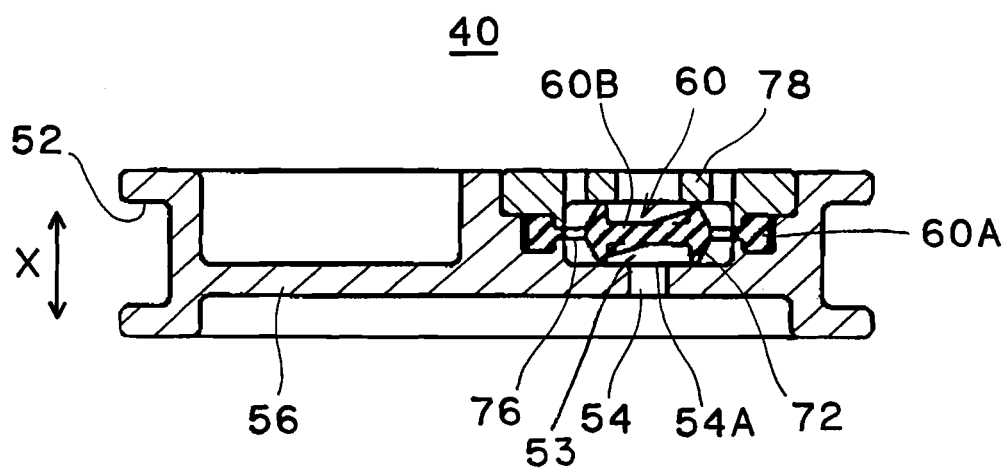
FIG. 2 is a cross-sectional view of a partition element of the embodiment.
Figure 3:
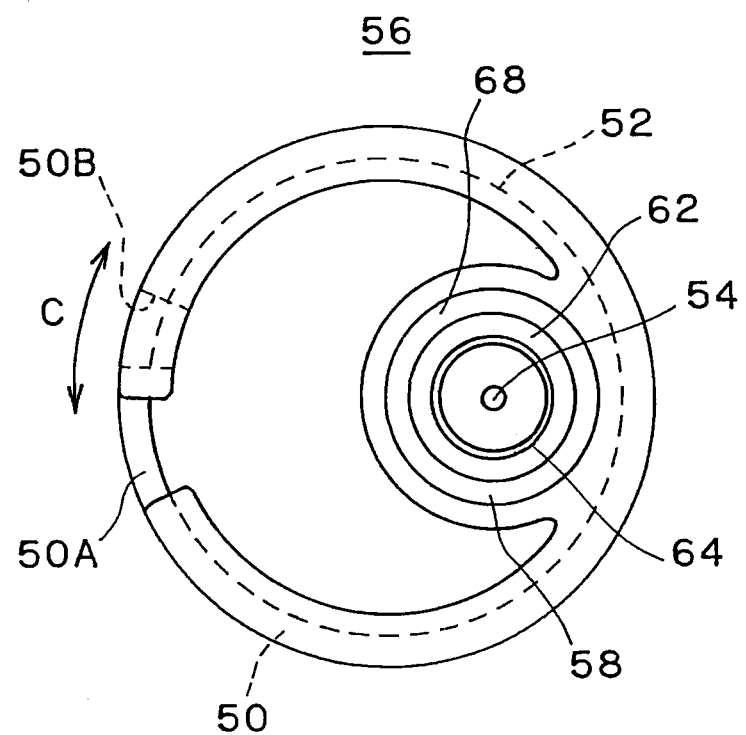
FIG. 3 is a plan view of a partition element body of the embodiment.

As shown in FIG. 2, the second orifice flow passage 54 is formed in the partition element 40 in a penetrating manner such that the second orifice flow passage 54 extends in the thickness direction (in this embodiment, in the same direction as the above-mentioned axial direction X) of the partition element 40 on an inner peripheral side of the partition element 40 (that is, a portion of the partition element arranged inside the outer peripheral portion in the radial direction). To be more specific, a stepped recessed portion 58 having a circular shape as viewed in a plan view is formed on an upper surface of the partition element body 56 (see FIG. 3), and the second orifice flow passage 54 is formed by forming a circular through hole in a center portion of the stepped recessed portion 58. Further, the above-mentioned second diaphragm 60 is mounted on the stepped recessed portion 58 in a state where the second diaphragm 60 faces the opening 54A of the second orifice flow passage 54 on a second sub liquid chamber 53 side in an opposed manner.

To be more specific, as shown in FIG. 7, the second diaphragm 60 has a disc shape (a circular membrane shape), wherein the outer peripheral portion 60A has a large wall thickness over the whole circumference, and the circular flexible membrane portion 60B is arranged inside the outer peripheral portion 60A having the large wall thickness. The flexible membrane portion 60B is formed at an intermediate position of the outer peripheral portion 60A in the thickness direction so as to close a space within an inner peripheral surface of the outer peripheral portion 60A. A ring-shaped restriction projection 64 is formed on an outer peripheral portion of the stepped recessed portion 58 of the partition element 40, and an annular groove 62 in which the outer peripheral portion 60A of the second diaphragm 60 is arranged is formed on the stepped recessed portion 58 outside the restriction projection 64.

A fixing member 66 is provided for fixing the second diaphragm 60 arranged in the stepped recessed portion 58. The fixing member 66 is made of a rigid material such as a resin or metal and is fitted in and fixed to a stepped portion 68 formed on an outer peripheral portion of the stepped recessed portion 58 as shown in FIG. 5. Due to such a constitution, the outer peripheral portion 60A of the second diaphragm 60 is sandwiched between the fixing member 66 and the annular groove 62 of the partition element body 56 in a state where the outer peripheral portion 60A of the second diaphragm 60 is compressed in the axial direction X and hence, the outer peripheral portion 60A of the second diaphragm 60 is liquid-tightly held. A restriction projection 70 having the substantially same ring shape as the restriction projection 64 formed on the stepped recessed portion 58 is formed on the fixing member 66 in a state where the restriction projection 70 faces the restriction projection 64 in an opposed manner. These restriction projections 64, 70 restrict the displacement of the outer peripheral portion 60A of the second diaphragm 60 in the radially inward direction.

A valve portion 72 which is brought into contact with a partition element wall surface 40A around the opening 54A of the second orifice flow passage 54 and closes the opening 54A is formed on the flexible membrane portion 60B of the second diaphragm 60. The valve portion 72 is mounted in a projecting manner on a membrane surface of the flexible membrane portion 60B on a second-sub-liquid-chamber-53 side which faces the above-mentioned opening 54A in an opposed manner. In this embodiment, the valve portion 72 is formed of a rubber wall portion having a surrounding (or peripheral) wall shape, to be more specific, a short cylindrical hollow shape which is raised from a lower surface of the flexible membrane portion 60B, is brought into contact with the periphery of the opening 54A and surrounds the opening 54A. The valve portion 72 closes the second orifice flow passage 54 by being pushed to the periphery of the opening 54A. Due to such a constitution, a space which is defined in the inside of the valve portion 72 having the surrounding wall shape and is surrounded by the valve portion 72 forms the above-mentioned second sub liquid chamber 53. That is, the space which is defined in the inside of the valve portion 72 and is arranged between a membrane portion 60C of the flexible membrane portion 60B and the partition element wall surface 40A around the opening 54A forms the second sub liquid chamber 53. The second diaphragm 60 constitutes a partition wall between the main liquid chamber 42 and the second sub liquid chamber 53.

The valve portion 72 is formed into a cylindrical shape so as to buffer an impact caused by contact of the valve portion 72 with the partition element 40 and also to buffer energy transmitted to the partition element 40 by allowing the deformation of the valve portion 72 in the axial direction X in a state where the valve portion 72 is brought into contact with the partition element 40. That is, the valve portion 72 is configured such that a size in the axial direction (a projection height from the flexible membrane portion 60B) Q is set larger than a wall thickness (an average wall thickness in the axial direction X) P (P Q) (see FIG. 7B). Further, the axial size Q is set larger than a wall thickness R of the flexible membrane portion 60B arranged outside the valve portion 72 (Q R). In this embodiment, an outer peripheral surface of the valve portion 72 is tapered such that a wall thickness is gradually decreased as the valve portion 72 extends toward a distal end side. That is, the valve portion 72 is formed into a cylindrical shape such that a distal end portion of the valve portion 72 has a small wall thickness and a base portion of the valve portion 72 has a large wall thickness on an outer peripheral surface side. Due to such a constitution, the valve portion 72 can be easily deformed in the axial direction X.

Further, ribs 74 for reinforcing the valve portion 72 each of which is formed of a projecting ridge are formed on the membrane portion 60C which forms an inner side of the valve portion 72. The plural (three in this embodiment) ribs 74 extend radially from the center of the membrane portion 60C, and are connected to an inner peripheral surface of the valve portion 72. As shown in FIG. 7B, an upper surface of the rib 74 is formed in an inclined manner such that the height of the upper surface of the rib 74 is gradually increased radially outwardly from the center of the valve portion 72 thus reinforcing the base portion of the valve portion 72.

As shown in FIG. 5, at least one through hole 76 is formed in the flexible membrane portion 60B at a position where the through hole 76 does not overlap the above-mentioned opening 54A of the second orifice flow passage 54, that is, at a position where the through hole 76 does not overlap the opening 54A in the axial direction X. The through holes 76 are formed outside the above-mentioned valve portion 72. As shown in FIG. 7C, the through holes 76 are arranged in a spaced-apart manner at plural positions on the circumference surrounding the valve portion 72. In this embodiment, four through holes 76 are formed in the flexible membrane portion 60B equidistantly. The through holes 76 are configured such that a total area of the through holes 76 is set larger than an area of the above-mentioned opening 54A of the second orifice flow passage 54.

Figure 4A:
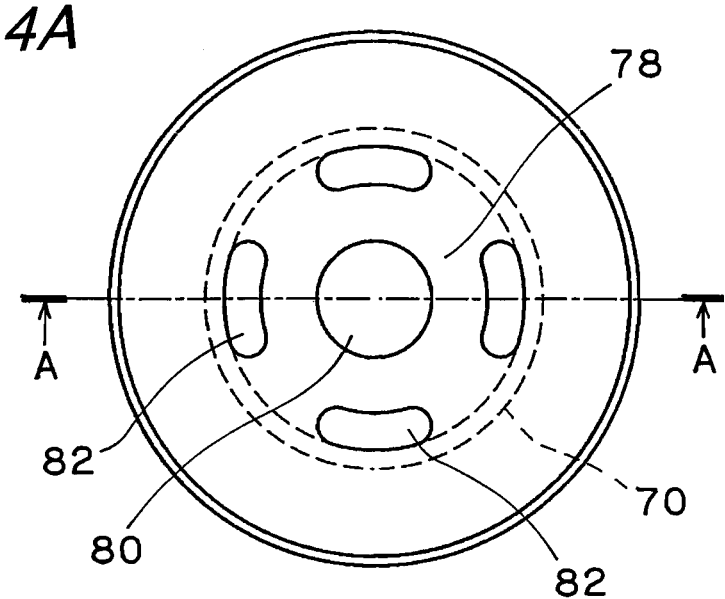
FIG. 4A is a bottom view of a fixing member of the embodiment.
Figure 4B:
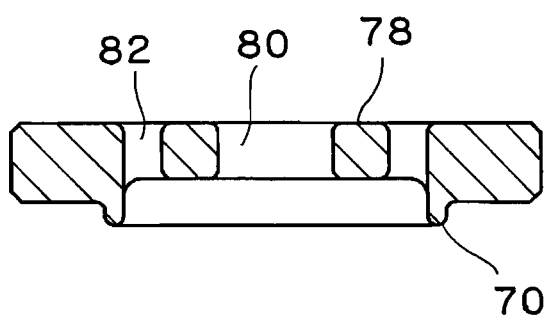
FIG. 4B is a cross-sectional view taken along a line A-A in FIG. 4A.

As shown in FIG. 5, on a main liquid chamber 42 side of the second diaphragm 60, a counter wall 78 which faces a membrane surface of the flexible membrane portion 60B on a main liquid chamber 42 side in an opposed manner with a space defined therebetween is arranged. The counter wall 78 is integrally formed with the fixing member 66. As shown in FIG. 4, in this embodiment, the fixing member 66 has a disc shape, and includes the restriction projection 70 on an outer peripheral portion thereof, and the circular counter wall 78 is arranged inside the restriction projection 70. A center through hole 80 is formed in a center portion of the counter wall 78 as a through hole which allows the main liquid chamber 42 and the second diaphragm 60 side to communicate with each other, and plural outer peripheral through holes 82 are formed around the center through hole 80.

The center through hole 80 is formed at a position where the center through hole 80 faces the membrane portion 60C inside the valve portion 72 in an opposed manner and, for preventing pressure loss in the center through hole 80, an opening area of the center through hole 80 is set larger than a cross-sectional area of the second orifice flow passage 54, that is, an area of the opening 54A.

The plural (four in this embodiment) outer peripheral through holes 82 are formed equidistantly in the circumferential direction on the circumference which overlap the circumference on which the through holes 76 formed on the second diaphragm 60 are arranged in the axial direction X and has the same diameter as the latter circumference. A total area of the outer peripheral through holes 82 is set larger than an area of the above-mentioned opening 54A of the second orifice flow passage 54. In this embodiment, the outer peripheral through holes 82 are arranged at positions where the outer peripheral through holes 82 overlap the through holes 76 formed in the second diaphragm 60 each other as viewed in the axial direction X, that is, at the position where the outer peripheral through holes 82 and the through holes 76 face each other in an opposed manner.

As shown in FIG. 5, a projection 84 which is brought into pressure contact with the above-mentioned counter wall 78 is formed on a membrane surface of the flexible membrane portion 60B of the second diaphragm 60 on a main liquid chamber 42 side opposite to a side where the above-mentioned valve portion 72 is formed. Due to such a constitution, a contact force of the valve portion 72 applied to the partition element wall surface 40A around the opening 54A can be adjusted. Accordingly, the projection 84 can be referred to as a valve portion contact force adjusting projection.

As shown in FIG. 7, the projection 84 is formed at a position where the projection 84 overlaps the valve portion 72 with the flexible membrane portion 60B sandwiched therebetween, that is, at a position where the projection 84 overlaps the valve portion 72 as viewed in the axial direction X. Accordingly, as shown in FIG. 5, the valve portion 72 and the projection 84 are held in a compressed state in the axial direction X between the partition element wall surface 40A around the opening 54A and the counter wall 78. To be more specific, the projection 84 is formed into a surrounding wall shape at a position where the projection 84 overlaps the valve portion 72 with the flexible membrane portion 60B sandwiched therebetween. That is, the projection 84 is a rubber wall portion having a surrounding wall shape, to be more specific, a short hollow cylindrical shape which is raised from an upper surface of the flexible membrane portion 60B, is brought into contact with the periphery of the above-mentioned center through hole 80 and surrounds the center through hole 80. In the same manner as the above-mentioned valve portion 72, an axial size (a projection height from the flexible membrane portion 60B) of the projection 84 is set larger than a wall thickness (an average wall thickness in the axial direction X) of the projection 84.

In this embodiment, as shown in FIG. 7, the valve portion 72 and the projection 84 are formed in a vertically symmetrical shape with respect to a center surface of the flexible membrane portion 60B in the thickness direction (a surface perpendicular to the thickness direction at the center in the thickness direction). Due to such a constitution, it is unnecessary to consider the directivity in the vertical direction at the time of assembling the second diaphragm 60 thus enhancing operability of assembling.

Ribs 86 for reinforcement are formed inside the projection 84 in the same manner as the ribs 74 on a lower surface side formed inside the above-mentioned valve portions 72. Although the ribs 86 are formed in the same shape as the ribs 74 on the lower surface side, the ribs 86 are arranged in a displaced manner in phase with respect to the ribs 74 on the lower surface side (see FIG. 7A to FIG. 7C).

Figure 6:
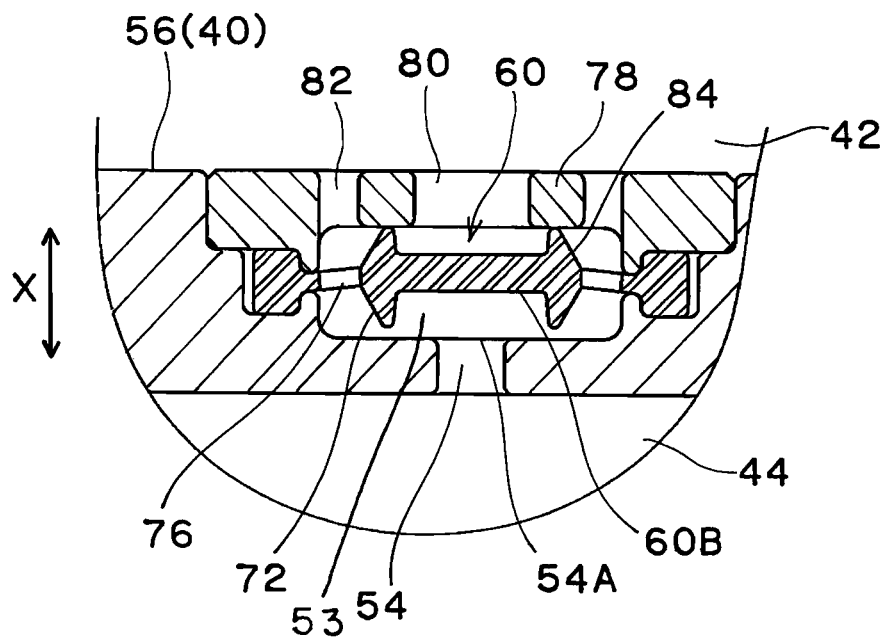
FIG. 6 is an enlarged cross-sectional view of a part of a second diaphragm of the partition element when the second diaphragm is deformed by flexure.

In the liquid-sealed antivibration device 10 having the above-mentioned constitution, in a usual use region where a liquid pressure in the main liquid chamber 42 is a predetermined value or more, the valve portion 72 of the second diaphragm 60 is brought into contact with the periphery of the above-mentioned opening 54A of the second orifice flow passage 54 so that the opening 54A is closed. That is, in the usual use region, the second sub liquid chamber 53 is closed by the valve portion 72 with respect to the main liquid chamber 42 so that a liquid which flows in the second orifice flow passage 54 is not leaked to the main liquid chamber 42. On the other hand, when the liquid pressure in the main liquid chamber 42 becomes a value lower than the predetermined value at which there is a possibility that cavitation occurs and a flow rate in the second orifice flow passage 54 becomes a predetermined amount or more, as shown in FIG. 6, in the second diaphragm 60 whose outer peripheral portion 60A is held, the flexible membrane portion 60B inside the outer peripheral portion 60A is deformed by flexure by being pushed to a main liquid chamber 42 side by the flow of the liquid so that the valve portion 72 is moved toward the main liquid chamber 42 side (that is, upwardly) away from the partition element wall surface 40A around the above-mentioned opening 54A. Accordingly, the second sub liquid chamber 53 is opened with respect to the main liquid chamber 42 so that the liquid can be supplied to the main liquid chamber 42 side from the through hole 76 formed in the flexible membrane portion 60B. Since the inflow of the liquid toward the second sub liquid chamber 53 side from the main liquid chamber 42 is prevented by the second diaphragm 60, the valve portion 72 functions as a check valve.

Accordingly, in the above-mentioned liquid-sealed antivibration device 10, in the normal use region, when vibrations of relatively large amplitude on a low frequency side are inputted to the liquid-sealed antivibration device 10 as in the case of shaking vibrations at the time of traveling of a vehicle, a liquid flows back and forth between the main liquid chamber 42 and the first sub liquid chamber 44 through the first orifice flow passage 50 on the low frequency side while preventing leaking of a liquid at the second diaphragm 60. Accordingly, due to a resonance action of a liquid which flows through the first orifice flow passage 50, the high damping performance can be acquired against shaking vibrations.

On the other hand, when vibrations of relatively minute amplitude on a high frequency side are inputted to the liquid-sealed antivibration device 10 at the time of idling where a vehicle is stopped, the second diaphragm 60 is deformed by flexure with minute amplitude while maintaining a closed state of the second sub liquid chamber 53. That is, the second sub liquid chamber 53 faces the main liquid chamber 42 by way of the second diaphragm 60 and hence, the second sub liquid chamber 53 assumes the same pressure state as the main liquid chamber 42. As a result, a fluid flows in the second orifice flow passage 54 due to the pressure difference between the main liquid chamber 42 and the first sub liquid chamber 44. Accordingly, the flow of the liquid occurs in the second orifice flow passage 54 in response to inputting of vibrations on a high frequency side and hence, due to a resonance action of a liquid which flows through the second orifice flow passage 54 on a high frequency side, the excellent antivibration effect can be acquired against idling vibrations.

On the other hand, when a flow rate in the second orifice flow passage 54 reaches a predetermined amount or more due to inputting of vibrations of large amplitude, the flexible membrane portion 60B is subjected to flexural deformation such that the valve portion 72 of the second diaphragm 60 is moved toward the main liquid chamber 42 side away from the partition element wall surface 40A around the opening 54A (see FIG. 6). Accordingly, the second sub liquid chamber 53 opens toward the main liquid chamber 42 side so that a liquid is supplied to the main liquid chamber 42 from the through hole 76 formed in the flexible membrane portion 60B and hence, the alleviation of pressure can be performed against the occurrence of an excessive negative pressure in the main liquid chamber 42 whereby the occurrence of cavitation can be suppressed.

When the flow rate of liquid in the second orifice flow passage 54 becomes a predetermined amount or less after the second diaphragm 60 is moved away from the partition element wall surface 40A, the second diaphragm 60 is again brought into contact with the partition element wall surface 40A around the opening 54A. Here, a restoring force is generated by elasticity of rubber and hence, an impact brought about by the return of the second diaphragm 60 is small whereby an abnormal sound is hardly generated by the return of the second diaphragm 60.

In this manner, in the antivibration device 10 of this embodiment, the second diaphragm 60 which plays a role of a diaphragm which generates the flow of a liquid in the second orifice flow passage 54 in a normal use region is used as a valve for alleviating a pressure when a flow rate of liquid in the second orifice flow passage 54 reaches a predetermined amount or more. Accordingly, the reduction of the number of parts and simplification of the structure can be realized. Further, the antivibration device 10 of this embodiment adopts the structure where the movable part which constitutes the valve is formed of the rubber-like elastic body and hence, it is unnecessary to perform rust prevention treatment which is necessary when a metal spring is used thus suppressing the increase of a cost.

According to this embodiment, the valve portion 72 is formed into a surrounding wall shape where the second sub liquid chamber 53 is formed inside the valve portion 72 and hence, when the second orifice flow passage 54 is closed, the valve portion 72 is elastically deformable in the axial direction X. Accordingly, for example, when vibrations of large amplitude are inputted at the time of traveling on a rough road or the like, the valve portion 72 is deformed even after the second orifice flow passage 54 is closed. Accordingly, the transmission of energy to the partition element 40 can be damped. That is, in this case, assuming kinetic energy of the flexible membrane portion 60B which is deformed by flexure as E1 and assuming energy consumed by the deformation of the valve portion 72 as E2, energy E transmitted to the partition element 40 is expressed by a formula E=E1-E2. Accordingly, the energy transmitted to the partition element 40 can be reduced by an amount of energy consumed by the deformation of the valve portion 72 so that the generation of abnormal sound can be further suppressed.

Further, in this embodiment, the valve portion contact force adjusting projection 84 formed on the flexible membrane portion 60B on a main liquid chamber 42 side is compressed between the counter wall 78 and the flexible membrane portion 60B and hence, rigidity of the second diaphragm 60 can be changed whereby timing at which the valve portion 72 is moved away from the opening 54A of the second orifice flow passage 54 can be easily adjusted.

To be more specific, to enhance characteristic of the second orifice flow passage 54 on a high frequency side, it is necessary to set rigidity of the second diaphragm 60 small so as to make the second diaphragm 60 easily deformable. However, when rubber hardness of the second diaphragm 60 is simply made small for making the second diaphragm 60 easily deformable, the second diaphragm 60 is easily deformed by flexure when vibrations of large amplitude is inputted so that the second diaphragm 60 is moved away from the opening 54A of the second orifice flow passage 54 at an early stage and hence, there exists a possibility that a damping performance which the first orifice flow passage 50 originally possesses is damaged. To the contrary, by forming the above-mentioned projection 84, while making rubber hardness small thus making the second diaphragm 60 deformable, rigidity of the valve portion 72 can be increased due to the compression of the projection 84 so that timing at which the second diaphragm 60 is moved away from the opening 54A of the second orifice flow passage 54 can be delayed. Further, by setting rubber hardness small in this manner, an impact which occurs when the second diaphragm 60 returns can be suppressed thus making an abnormal sound hardly generated.

Particularly, in this embodiment, the projection 84 is formed at the position where the projection 84 overlaps the valve portion 72, and the projection 84 and the valve portion 72 are held in a compressed state between the partition element wall surface 40A around the opening 54A and the counter wall 78. Accordingly, the rigidity of the valve portion 72 can be increased more effectively so that timing at which the second diaphragm 60 is moved away from the opening 54A can be controlled more effectively. Particularly, by forming the valve portion 72 and the projection 84 in a vertically symmetrical shape, the compression of the valve portion 72 and the projection 84 can be vertically uniformly maintained and hence, this structure is more advantageous. Although the projection 84 is formed of a single cylindrical projection in this embodiment, the projection 84 may be formed of plural projections provided that a contact force can be adjusted by compressing the valve portion 72, for example.

Further, in this embodiment, by forming the ribs 74, 86 for reinforcement inside the valve portion 72 and the projection 84 respectively, the prevention of the collapse of the valve portion 72 and the projection 84 due to the repetition of separation and return of these portions can be improved thus realizing both the reduction of an abnormal sound and reliability of the antivibration device 10.

In the above-mentioned embodiment, in the counter wall 78 of the fixing member 66, together with the center through hole 80, the peripheral through holes 82 are formed around the center through hole 80. This constitution is adopted due to the following reason. The antivibration device 10 of this embodiment adopt the structure where the projection 84 is brought into contact with the periphery of the center through hole 80 so as to liquid-tightly seal the center through hole 80. Accordingly, in a state where the valve portion 72 closes the opening 54A, a liquid pressure in the main liquid chamber 42 is applied to the film portion 60C inside the valve portion 72 through the center through hole 80, while in a state where the valve portion 72 is moved away from the opening 54A, a liquid is supplied to the main liquid chamber 42 from the outer peripheral through holes 82 formed in the counter wall 78 through the through holes 76 on an outer peripheral side of the valve portion 72. Accordingly, in a case where the antivibration device 10 of this embodiment does not adopt the structure where the projection 84 seals the center through hole 80, either one of the center through hole 80 and the outer peripheral through holes 82 can be omitted.

Further, in the above-mentioned embodiment, the explanation has been made with respect to the case where two sub liquid chambers consisting of the first sub liquid chamber 44 and the second sub liquid chamber 53 are provided together with the main liquid chamber 42 as the liquid chambers. However, three or more sub liquid chambers may be provided. In this case, the sub liquid chamber which communicates with the main liquid chamber by way of the first orifice flow passage and the sub liquid chamber which communicates with the second sub liquid chamber by way of the second orifice flow passage may be the same liquid chamber or different chambers.

Preferably, as in the case of the above-mentioned embodiment, the second orifice flow passage 54 connects the first sub liquid chamber 44 whose chamber wall is partially formed of the first diaphragm 38 which faces the air chamber 46 and the second sub liquid chamber 53 to each other. The pressure in the first sub liquid chamber 44 whose chamber wall is partially formed of the first diaphragm 38 which faces the air chamber 46 and the pressure in the second sub liquid chamber 53 whose chamber wall is partially formed of the second diaphragm 60 which faces the main liquid chamber 42 largely differ from each other and hence, a flow rate of a liquid in the second orifice flow passage 54 can be easily increased whereby a pressure damping effect generated by the above-mentioned second diaphragm 60 can be enhanced. The first diaphragm 38 may face the outside air in place of the air chamber 46. Accordingly, as a preferred embodiment, an example where the first sub liquid chamber which is connected with the second sub liquid chamber by the second orifice flow passage is a sub liquid chamber whose chamber wall is partially formed of a diaphragm which constitutes a partition wall for the air chamber or the outside air is named.

Further, as a preferred embodiment, the liquid-sealed antivibration device may be constituted such that the first mounting part has a cylindrical shape, the second mounting part is arranged on an axis of the first mounting part, the first diaphragm formed of an elastomeric membrane which is mounted on the first mounting part and forms a liquid sealed chamber between the first diaphragm and the antivibration base body inside the first mounting part is provided, the partition element partitions the liquid sealed chamber into the main liquid chamber on the antivibration base body side and the first sub liquid chamber on the first diaphragm side, the first orifice flow passage is formed on the outer peripheral portion of the partition element and connects the main liquid chamber and the first sub liquid chamber to each other, and the second orifice flow passage is provided such that the second orifice flow passage connects the first sub liquid chamber and the second sub liquid chamber to each other at a portion of the partition element inside the outer peripheral portion. Also in this case, the first diaphragm which forms a part of the chamber wall of the sub liquid chamber faces the air chamber or the outside air and hence, the preferred embodiment is advantageous for increasing the above-mentioned pressure damping effect.

Although an object to be damped is shaking vibrations or idling vibrations in the above-mentioned embodiment, the object to be damped is not limited to these vibrations, and the present invention is also applicable to various kinds of vibrations which differ from each other in frequency. Further, although not enumerated in detail, various modifications are conceivable.

According to the embodiments, in the normal use region, the valve portion of the second diaphragm having a surrounding wall shape is brought into contact with the periphery of the opening of the second orifice flow passage on a main liquid chamber side and closes the opening and hence, leaking of a liquid from such a portion can be prevented. When a flow rate of liquid in the second orifice flow passage becomes a predetermined amount or more, the valve portion is subjected to flexural deformation such that the valve portion is moved toward the main liquid chamber side away from the partition element wall surface around the opening of the second orifice flow passage and hence, the liquid can be supplied to the main liquid chamber side from the through hole formed in the flexible membrane portion. Accordingly, in the normal use region, the antivibration device can alleviate cavitation caused by a sudden change in pressure when vibrations of large amplitude are inputted while exhibiting a damping performance against vibrations in a low frequency range by the first orifice flow passage and antivibration effect against vibrations in a high frequency range by the second orifice flow passage. Further, an impact which is caused when the second diaphragm returns to an original position can be made small so that an abnormal sound can be reduced. Further, rust prevention treatment or the like becomes unnecessary and hence, the reduction of a cost can be realized. Still further, the valve portion has a surrounding wall shape (elastic wall shape) which is raised from the membrane surface of the flexible membrane portion and hence, the absorption of energy can be realized by deformation whereby an impact transmitted to the partition element can be further reduced leading to further reduction of an abnormal sound.

The disclosure is applicable to various kinds of antivibration devices such as a body mount, a differential gear mount, and a mount which supports a power unit such as a motor, in addition to the engine mounts, for example.

What is claimed is:

1. A liquid-sealed antivibration device comprising:
    a first mounting part to be mounted on one of a vibration source side and a support side;
    a second mounting part to be mounted on the other of the vibration source side and the support side;
    an antivibration base body formed of an elastomer which is interposed between the first mounting part and the second mounting part;
    a main liquid chamber whose chamber wall is partially formed of the antivibration base body and in which a liquid is sealed;
    a first sub liquid chamber whose chamber wall is partially formed of a first diaphragm formed of an elastomer and in which a liquid is sealed;
    a partition element which partitions the main liquid chamber and the first sub liquid chamber; and
    a first orifice flow passage which connects the main liquid chamber with the first sub liquid chamber, wherein
    the partition element comprises:
    a second diaphragm which is formed of an elastomer and includes an outer peripheral portion which is liquid-tightly held by the partition element and a flexible membrane portion which is arranged inside the outer peripheral portion;
    a second sub liquid chamber which is divided from the main liquid chamber by way of the second diaphragm;
    a second orifice flow passage which connects the first sub liquid chamber and the second sub liquid chamber to each other while being tuned to a frequency range higher than a frequency range to which the first orifice flow passage is tuned; and
    a counter wall which faces a membrane surface of the flexible membrane portion on a main liquid chamber side in an opposed manner with a space defined therebetween on a main liquid chamber side of the second diaphragm, and
    in the flexible membrane portion, a valve portion which is brought into contact with a partition element wall surface around an opening of the second orifice flow passage and closes the opening while surrounding the opening is formed into a surrounding wall shape such that the valve portion is raised from the membrane surface of the flexible membrane portion, a space surrounded by the valve portion inside the valve portion having the surrounding wall shape forms the second sub liquid chamber, a through hole is formed in the flexible membrane portion outside the valve portion, and a projection which is brought into pressure contact with the counter wall is formed on the membrane surface of the flexible membrane portion on a main liquid chamber side, and
    the valve portion and the projection are held in a compressed state between the partition element wall surface around the opening and the counter wall, and
    further wherein the valve portion is configured to be in contact with the partition element well surface in a non-flexural state, and is configured to be moved away from the partition element wall surface by flexural deformation of the second diaphragm when a flow rate of the second orifice flow passage becomes a predetermined amount or more.

2. The liquid-sealed antivibration device according to claim 1, wherein the projection is formed at a position where the projection overlaps the valve portion with the flexible membrane portion sandwiched therebetween.

3. The liquid-sealed antivibration device according to claim 2, wherein the projection is formed into a surrounding wall shape at a position where the projection overlaps the valve portion with the flexible membrane portion sandwiched therebetween.

4. The liquid-sealed antivibration device according to claim 3, wherein the valve portion and the projection are formed in a symmetrical shape with respect to a center surface of the flexible membrane portion in the thickness direction.

5. The liquid-sealed antivibration device according to claim 1, wherein the second diaphragm is configured such that the flexible membrane portion is deformed by flexure such that the valve portion is moved toward the main liquid chamber side away from the partition element wall surface around the opening thus supplying a liquid to the main liquid chamber side through the through hole formed in the flexible membrane portion.

6. The liquid-sealed antivibration device according to claim 5, wherein a center through hole is formed in the counter wall at a position where the center through hole faces a membrane portion inside the valve portion in an opposed manner, a plurality of outer peripheral through holes are formed around the center through hole, and the projection has a surrounding wall shape surrounding the center through hole.

7. The liquid-sealed antivibration device according to claim 6, wherein the projection is in contact with the periphery of the center through hole so as to liquid-tightly seal the center through hole.

8. The liquid-sealed antivibration device according to claim 1, wherein a rib is formed on a membrane portion inside the valve portion.

9. The liquid-sealed antivibration device according to claim 1, wherein a center through hole is formed in the counter wall at a position where the center through hole faces a membrane portion inside the valve portion in an opposed manner, a plurality of outer peripheral through holes are formed around the center through hole, and the projection has a surrounding wall shape surrounding the center through hole.

10. The liquid-sealed antivibration device according to claim 1, wherein the first diaphragm is a diaphragm which constitutes a partition wall between the first sub liquid chamber and an air chamber or an outside air.

11. The liquid-sealed antivibration device according to claim 1, wherein the first mounting part has a cylindrical shape, the second mounting part is arranged on an axis of the first mounting part, the first diaphragm is mounted on the first mounting part and forms a liquid sealed chamber between the first diaphragm and the antivibration base body inside the first mounting part, the partition element partitions the liquid sealed chamber into the main liquid chamber on the antivibration base body side and the first sub liquid chamber on the first diaphragm side, the first orifice flow passage is formed on an outer peripheral portion of the partition element and connects the main liquid chamber and the first sub liquid chamber to each other, and the second orifice flow passage is provided such that the second orifice flow passage connects the first sub liquid chamber and the second sub liquid chamber to each other at a portion of the partition element inside the outer peripheral portion.

12. The liquid-sealed antivibration device according to claim 1, wherein a through hole is formed in the counter wall, and an opening area of the through hole is larger than a cross-sectional area of the second orifice flow passage.

\* \* \* \* \*